June 21, 1949.    B. STEPHENSON    2,473,616
ELLIPTICAL BOUNDARY FRAME FOR OPENINGS
IN PRESSURE CABINS FOR AIRCRAFT Filed Jan. 14, 1947    3 Sheets-Sheet 1

Inventor
Basil Stephenson
By Moses, Nolte, Clews & Berry
attys.

June 21, 1949.  B. STEPHENSON  2,473,616
ELLIPTICAL BOUNDARY FRAME FOR OPENINGS
IN PRESSURE CABINS FOR AIRCRAFT
Filed Jan. 14, 1947  3 Sheets-Sheet 3
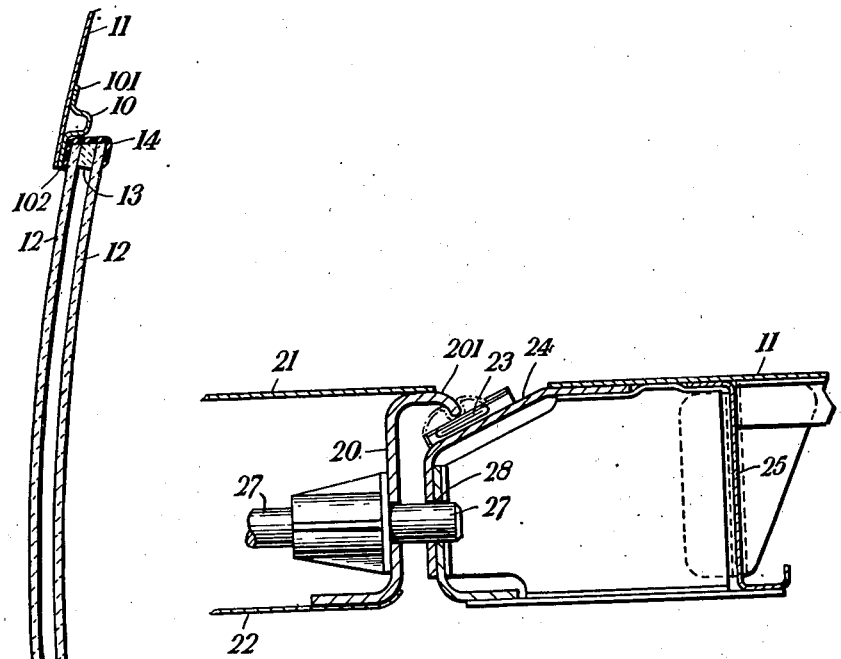
Fig. 5.
Fig. 3.
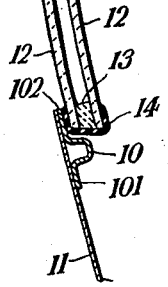
Inventor
Basil Stephenson
By Mosie, Nolte, Crews & Berry
Attys.

Patented June 21, 1949

2,473,616

UNITED STATES PATENT OFFICE 2,473,616

ELLIPTICAL BOUNDARY FRAME FOR OPENINGS IN PRESSURE CABINS FOR AIRCRAFT

Basil Stephenson, Weybridge, England, assignor to Vickers-Armstrongs Limited, London, England Application January 14, 1947, Serial No. 721,997
In Great Britain January 19, 1946

3 Claims. (Cl. 244—129)

The provision of openings for doors, windows and like closures in the shell of a pressurised cabin, in which the internal air pressure may vary between 2 and 8 lbs./sq. inch in excess of the external atmospheric pressure, imparts into the structure an inherent weakness which requires to be compensated by reinforcing the cabin shell and stiffening the door or other closure at the expense of a considerable increase in weight. This is even more particularly the case where the opening is of the conventional rectangular shape.

The present invention is directed to the problem of providing an improved arrangement of door and window opening in which the shape will be so proportioned that the additional structural weight requisite to compensate the aforesaid weakness will be reduced to a minimum.

In a pressure cabin shell of cylindrical form, in accordance with the conventional practice, it can be shown that the circumferential stress is twice that of the longitudinal stress, and since the circumferential and longitudinal stresses in the plating of the door or the like are very similar to those in the main shell, the invention consists in making the door or like opening substantially in the shape of an ellipse of which the major and minor axes are determined by the ratio $$\frac{A^2}{B^2} = \frac{C}{L}$$

where A is the length of the major axis, B the length of the minor axis, C the circumferential load per unit width and L the longitudinal load per unit width. The major axis of the ellipse is disposed circumferentially on the shell. The door or the like is made of the same shape and proportions.

It has been found that a constructional arrangement in accordance with the foregoing proportions calls for the minimum weight of compensatory reinforcement of the shell and stiffening of the door or the like. Using an outer frame of hoop-formation for the opening in the shell and a simple plate structure having a marginal hoop for the door or the like, the stresses in the hoop-frame of the opening are mainly tensile, and the stresses in the boundary hoop of the door or the like are mainly compressive.

Figure 1:
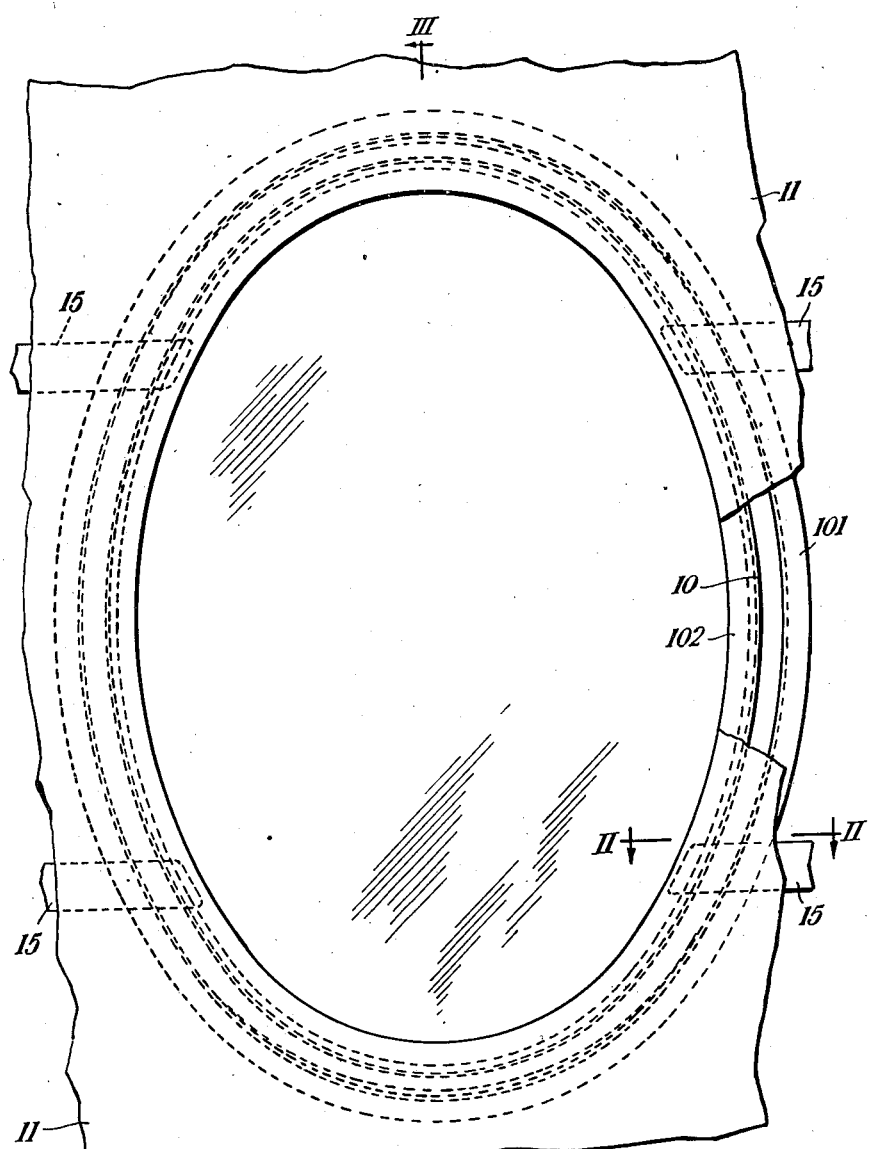
Figure 2:
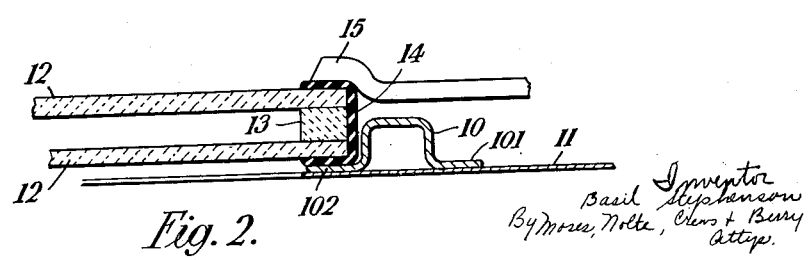
Figure 4:
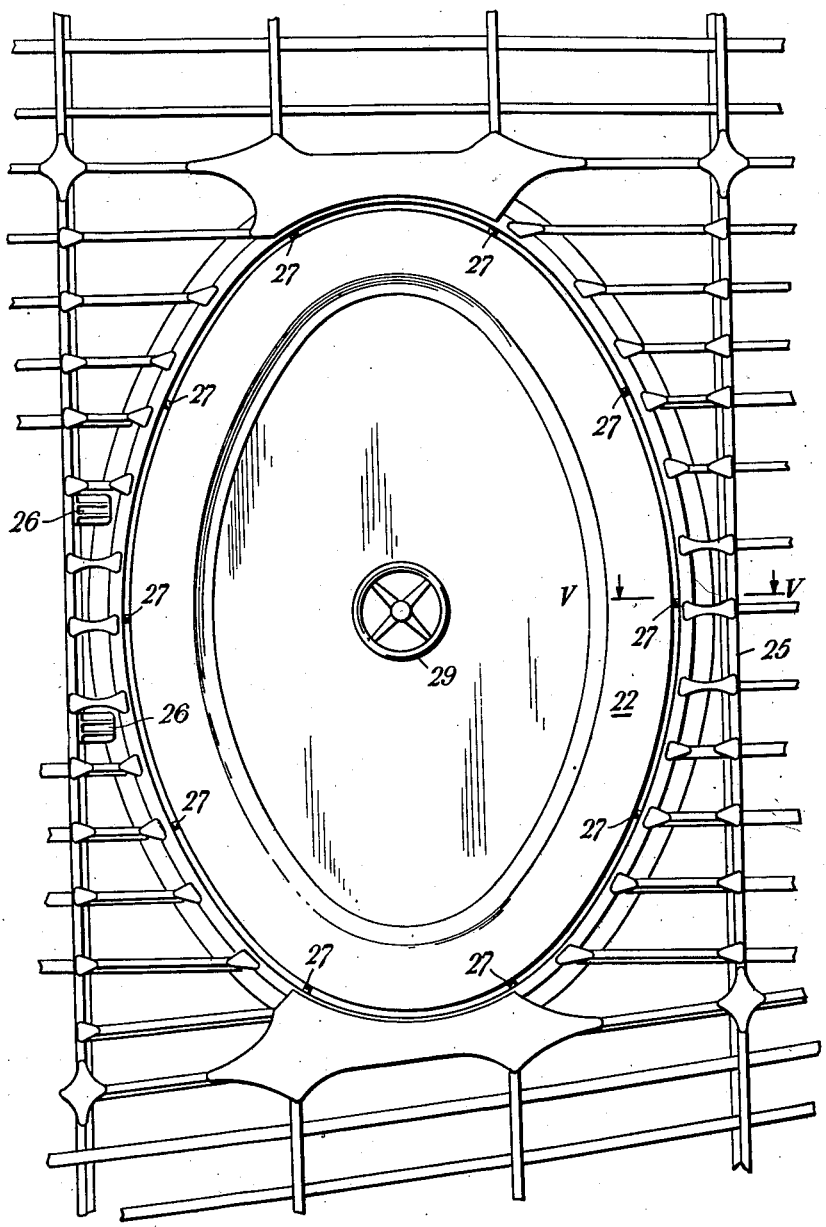

The manner in which the invention may be carried into effect is hereinafter described with reference to the accompanying drawings. In said drawings Fig. 1 is an elevation of a portion of a pressurised fuselage, depicting a window opening (viewed from the outside) as constructed in accordance with the invention; Figs. 2 and 3 are fragmentary sectional views, respectively taken on the lines II—II and III—III of Fig. 1. Fig. 4 is an elevation of a portion of a pressurised fuselage, depicting a door opening (viewed from the inside) as constructed in accordance with the invention; Fig. 5 is a fragmentary section taken on the line V—V of Fig. 4.

In the case of the window opening illustrated in Figs. 1 to 3, the boundary member of the opening in the shell consists of an elliptical hoop 10 of channel-section, having its flange 101 and 102 riveted to the plating 11. The flange 102 constitutes a seating for the window, which is preferably composed of an airtight sandwich of transparent plastic material, built up from two curved sheets 12, 12 and a marginal insert 13 and the whole cemented together to form an integral rigid window. The rim of the window is enclosed in a channel-section strip 14 of india-rubber or other appropriate resilient sealing material, making an airtight joint between the window and the seating flange 102 of the hoop 10. Withdrawable bolts or snugs 15, 15 are provided to support the window against inward displacement when the external atmospheric pressure exceeds that of the interior of the cabin; at other times the window is maintained in position by the super-atmospheric pressure of the air within the cabin.

The door depicted in Figs. 4 and 5 is arranged to open outwards, and it is provided about its boundary with an elliptical hoop member 20 of Z-section to the limbs of which inner and outer sheets 21, 22 of plating are riveted. The member 20 has an outwardly-directed flange 201 which cooperates with an inflatable sealing tube 23 of known construction, to form an airtight joint about the door. The door-frame is constituted by an elliptical hoop 24 which is incorporated in a built-up structure attached to the circumferential frame-members 25 of the fuselage. The door, which is hinged at 26, 26 is held closed by bolts 27 arranged to be received in sockets 28 in the member 24; there are a plurality of such bolts 27 spaced about the entire periphery of the door, and all are adapted to be operated simultaneously by means of the handwheel 29 which is provided on the interior of the door.

It wil be understood that the hoop-member 10 of the window opening, and the hoop-member 24 of the door opening, both conform to the conditions prescribed by the invention, inasmuch as both are ellipses of which the ratio of the squares of the major and minor axes is equal to the ratio of the circumferential and longitudinal loads per unit width, the major axes being disposed circumferentially on the shell.

What I claim as my invention and desire to secure by Letters Patent is:

1. A pressure cabin of circular cross section having the window, door and like openings, and the windows, doors and like members relating thereto, of substantially the shape of an ellipse of which the major and minor axes are so proportioned that the ratio of their squares is equal to the ratio between the circumferential and longitudinal loads per unit width in the shell of the cabin, and the major axes being disposed circumferentially on the shell.

2. In a pressure cabin as claimed in claim 1, a window opening having an elliptical hoop boundary member attached to the plating, an elliptical window seating against an outwardly directed flange of said hoop member, and a resilient sealing strip disposed about the periphery of said window to seal the joint between the latter and the hoop.

3. In a pressure cabin as claimed in claim 1, a door opening having an elliptical hoop boundary member, carried by the circumferential members of the fuselage structure, an outwardly-opening door provided with a marginal hoop, means providing a seal between the door hoop flange and the boundary member, and means for bolting the door hoop to the fuselage hoop against outward displacement by a super-atmospheric air pressure in the cabin.

BASIL STEPHENSON.

REFERENCES CITED

The following references are of record in the file of this patent:

UNITED STATES PATENTS

| Number | Name | Date |
|---|---|---|
| 1,779,162 | Evers | Oct. 21, 1930 |
| 2,104,144 | Zand | Jan. 4, 1938 |
| 2,293,656 | McClain | Aug. 18, 1942 |
| 2,409,808 | Sowle | Oct. 22, 1946 |

FOREIGN PATENTS

| Number | Country | Date |
|---|---|---|
| 34,008 | Switzerland | Aug. 10, 1905 |